US012430791B1

(12) United States Patent
Wei et al.

(10) Patent No.: US 12,430,791 B1
(45) Date of Patent: Sep. 30, 2025

(54) HAND TRACKING SYSTEM AND METHOD

(71) Applicant: HTC Corporation, Taoyuan (TW)

(72) Inventors: Min Chia Wei, Taoyuan (TW);
Ting-Wei Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/623,036

(22) Filed: Apr. 1, 2024

(51) Int. Cl.
*G06T 7/70* (2017.01)
*G06V 40/20* (2022.01)
*G09B 5/02* (2006.01)

(52) U.S. Cl.
CPC ............... *G06T 7/70* (2017.01); *G06V 40/28* (2022.01); *G09B 5/02* (2013.01)

(58) Field of Classification Search
CPC .................................. G06T 7/70; G06V 40/28
See application file for complete search history.

(56) References Cited

U.S. PATENT DOCUMENTS

| 10,636,170 | B1* | 4/2020 | Reddy | G06F 3/012 |
| 12,229,332 | B1* | 2/2025 | Chung | G06T 7/246 |
| 2007/0035563 | A1* | 2/2007 | Biocca | G06F 3/0346 345/633 |
| 2007/0298882 | A1* | 12/2007 | Marks | G06F 3/017 463/36 |
| 2011/0110560 | A1* | 5/2011 | Adhikari | G06F 3/017 382/103 |
| 2013/0172058 | A1* | 7/2013 | Marty | G06T 13/20 463/2 |
| 2013/0268254 | A1* | 10/2013 | Senno | G06T 7/73 703/6 |
| 2016/0086349 | A1 | 3/2016 | Shotton et al. | |
| 2016/0140763 | A1* | 5/2016 | Seichter | G06F 3/04812 345/633 |
| 2016/0247070 | A1* | 8/2016 | Li | H04L 63/1416 |
| 2016/0266644 | A1* | 9/2016 | Yamamoto | G06F 3/002 |
| 2017/0282062 | A1* | 10/2017 | Black | A63F 13/25 |
| 2018/0364048 | A1* | 12/2018 | Cook | G06F 3/0346 |
| 2018/0369699 | A1* | 12/2018 | Ghanchi | A63F 13/812 |
| 2020/0230482 | A1* | 7/2020 | Thornbrue | G06T 7/20 |
| 2023/0221830 | A1 | 7/2023 | Gutknecht et al. | |

OTHER PUBLICATIONS

Pointing Gesture Recognition based on 3D-Tracking of Face, Hands and Head Orientation. Kai Nickel, Jun. 15, 2016. (Year: 2016).*
"Office Action of Taiwan Counterpart Application", issued on Sep. 25, 2024, pp. 1-5.

* cited by examiner

*Primary Examiner* — Ming Shui
(74) *Attorney, Agent, or Firm* — JCIPRNET

(57) ABSTRACT

This disclosure provides a hand tracking system. A camera is configured to obtain a hand image of a hand of a user. A tracker is adapted to be attached to an object and configured to obtain tracker data. A processor is configured to determine the hand being touching the object based on the hand image or the tracker data. The processor is configured to determine a contact portion of the object based on the object. The contact portion is adapted to be in contact with the hand of the user. The processor is configured to determine a hand gesture of the user based on the hand image. The processor is configured to determine a hand pose of the hand and an object pose of the object based on the hand gesture and the contact portion.

19 Claims, 9 Drawing Sheets

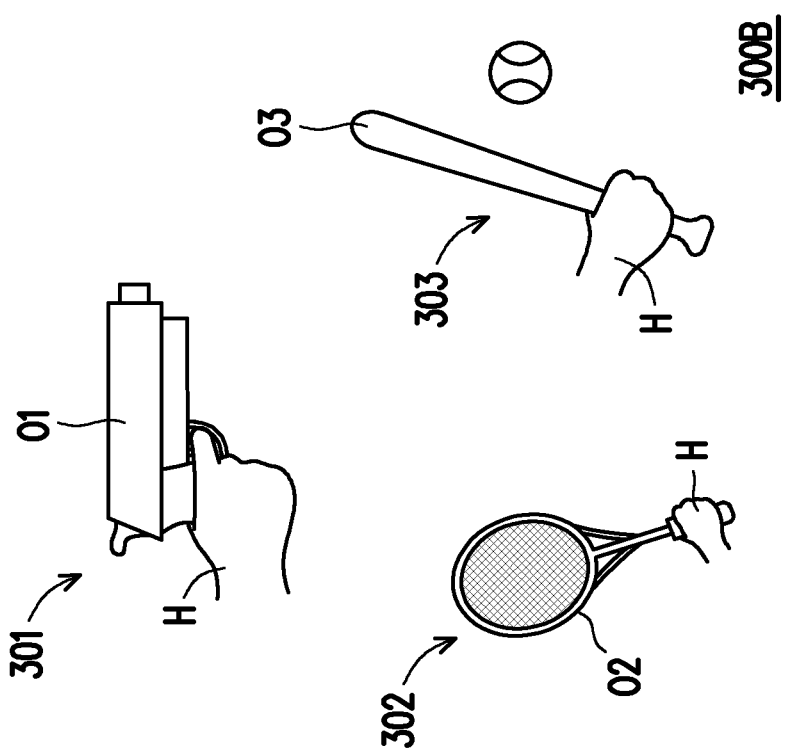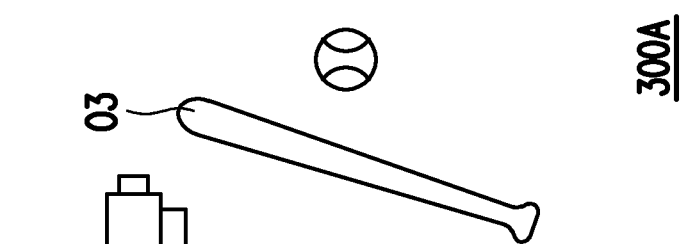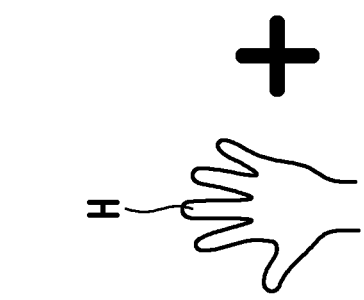
FIG. 3B
FIG. 3A

HAND TRACKING SYSTEM AND METHOD

BACKGROUND

Technical Field

The disclosure relates to a hand tracking system; particularly, the disclosure relates to a hand tracking system and a hand tracking method.

Description of Related Art

In order to bring an immersive experience to user, technologies related to extended reality (XR), such as augmented reality (AR), virtual reality (VR), and mixed reality (MR) are constantly being developed. AR technology allows a user to bring virtual elements to the real world. VR technology allows a user to enter a whole new virtual world to experience a different life. MR technology merges the real world and the virtual world. Further, to bring a fully immersive experience to the user, visual content, audio content, or contents of other senses may be provided through one or more devices.

SUMMARY

The disclosure is direct to a hand tracking system and hand tracking method, so as to improve the hand tracking of the hand while the hand is holding an object.

In this disclosure, a hand tracking system is provided. The hand tracking system includes a camera, a tracker, a memory, and a processor. The camera is configured to obtain a hand image of a hand of a user. The tracker is adapted to be attached to an object and configured to obtain tracker data. The memory is configured to store a program code. The a processor, configured to access the program code to execute: determining the hand being touching the object based on the hand image or the tracker data; determining a contact portion of the object based on the object, wherein the contact portion is adapted to be in contact with the hand of the user; determining a hand gesture of the user based on the hand image; and determining a hand pose of the hand and an object pose of the object based on the hand gesture and the contact portion.

In this disclosure, a hand tracking method is provided. The hand tracking method includes: obtaining, by a camera, a hand image of a hand of a user; obtaining, by a tracker, tracker data, wherein the tracker is adapted to be attached to an object; determining, by a processor, the hand being touching the object based on the hand image or the tracker data; determining a contact portion of the object based on the object, wherein the contact portion is adapted to be in contact with the hand of the user; determining a hand gesture of the user based on the hand image; and determining a hand pose of the hand and an object pose of the object based on the hand gesture and the contact portion.

Based on the above, according to the hand tracking system and the hand tracking method, the hand and the object may be tracked correctly while the hand is holding an object.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 3A is a schematic diagram of an interaction scenario between a hand and an object according to an embodiment of the disclosure.

FIG. 3B is a schematic diagram of an interaction scenario between a hand and an object according to an embodiment of the disclosure.

DESCRIPTION OF THE EMBODIMENTS

Figure 1:
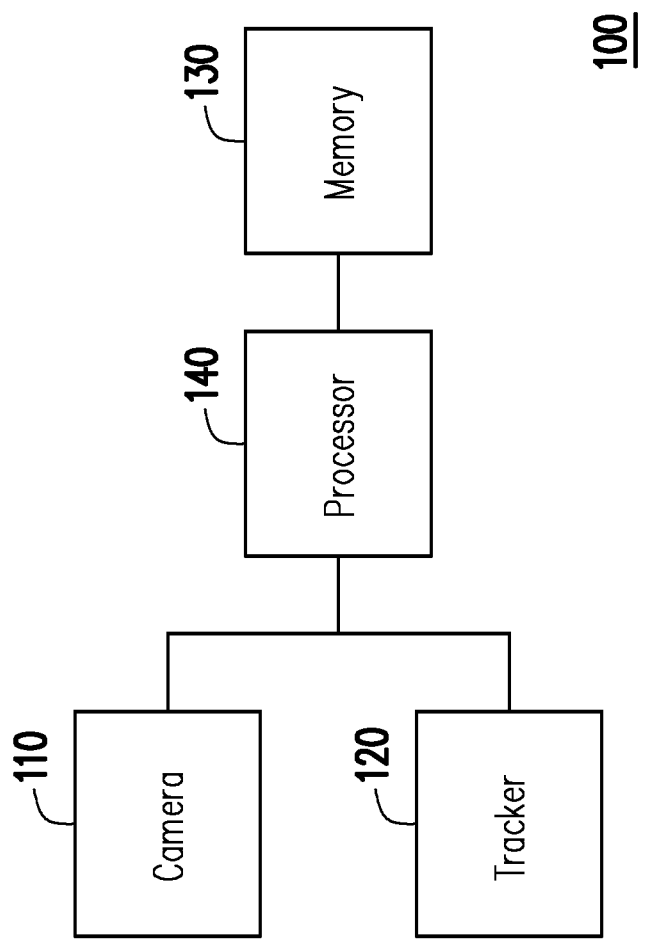
FIG. 1 is a schematic diagram of a hand tracking system according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

In order to improve the immersive experience, physical objects in the real world may be used to represent virtual object in the virtual. For example, when users can physically touch and interact with virtual objects, it can make the virtual experience feel more real and immersive. This is especially true for tasks that require precision or dexterity, such as painting a picture, assembling a piece of furniture, or playing a musical instrument. Moreover, using a physical object to grab as a virtual object can also reduce the cognitive load on users. This is because they don't have to learn new and complex controls. Instead, they can rely on their existing knowledge of how to interact with physical objects in the real world.

However, while the user is holding a physical object, part of the hand of the user may be occluded by the physical object, thereby decreasing the accuracy of the hand tracking. Further, while a position of the physical object or the hand is not identified clearly, in the virtual world, there may be an offset shown between the virtual object and the virtual hand. Since there is the offset, the virtual object may not seem to stick to the virtual hand. That is, the virtual hand or the virtual hand gesture of the virtual hand may look awkward. In other words, the non-realist phenomenon may have a negative impact on the user experience, thereby decreasing the immersive experience. Therefore, it is the pursuit of people skilled in the art to provide a more realistic manner to convert a relationship between the physical object and the hand to a relationship between the virtual object and the virtual hand.

FIG. 1 is a schematic diagram of a hand tracking system according to an embodiment of the disclosure. With reference to FIG. 1, a hand tracking system 100 may include a camera 110, a tracker 120, a memory 130, and a processor 140. In one embodiment, the camera 110, the tracker 120, the memory 130, and/or the processor 140 may be integrated in a single electronic device or separated from the each other, but is not limited thereto. In one embodiment, the camera 110, the memory 130, and the processor 140 may be included in a head-mounted display (HMD) device and the tracker 120 may be included in an object. In another embodiment, the camera 110 may be placed somewhere other than the head of the user to capture images of the user. However, this disclosure is not limited thereto.

In one embodiment, the camera 110 may include, for example, a complementary metal oxide semiconductor (CMOS) camera or a charge coupled device (CCD) camera. In one embodiment, the camera 110 may be disposed on a HMD device, wearable glasses (e.g., AR/VR goggles), an electronic device, other similar devices, or a combination of these devices. However, this disclosure is not limited thereto.

In one embodiment, the tracker 120 may include, for example, a gyroscope, an accelerometer, an inertial measurement unit (IMU) sensor, other similar devices, or a combination of these devices. However, this disclosure is not limited thereto.

In one embodiment, the memory 130 may include, for example, any type of fixed or removable random access memory (RAM), read-only memory (ROM), flash memory, hard disk, other similar devices, or a combination of these devices and may be used to record multiple program codes or modules. However, this disclosure is not limited thereto.

In one embodiment, each component in the hand tracking system 100 may include a communication circuit and the communication circuit may include, for example, a wired network module, a wireless network module, a Bluetooth module, an infrared module, a radio frequency identification (RFID) module, a Zigbee network module, or a near field communication (NFC) network module, but the disclosure is not limited thereto. That is, each component in the hand tracking system 100 may communicate with each other through either wired communication or wireless communication.

In one embodiment, the processor 140 may be coupled to the camera 110, the tracker 120, and the memory 130. In embodiment, the processor 140 and may be a general purpose processor, a special purpose processor, a conventional processor, a digital signal processor, multiple microprocessors, one or more microprocessors combined with a digital signal processor core, a controller, a microcontroller, an application specific integrated circuit (ASIC), a field programmable gate array (FPGA), any other kind of integrated circuits, state machines, processors based on advanced RISC machine (ARM), and the like.

In one embodiment, the processor 140 may transmit data to and receive data from the camera 110, the tracker 120, and the memory 130. Further, the memory 130 may be configured to store a program code, and the processor 140 may access the program codes recorded in the memory 130 to perform a hand tracking method of the disclosure, and the details of which are described below.

Figure 2:
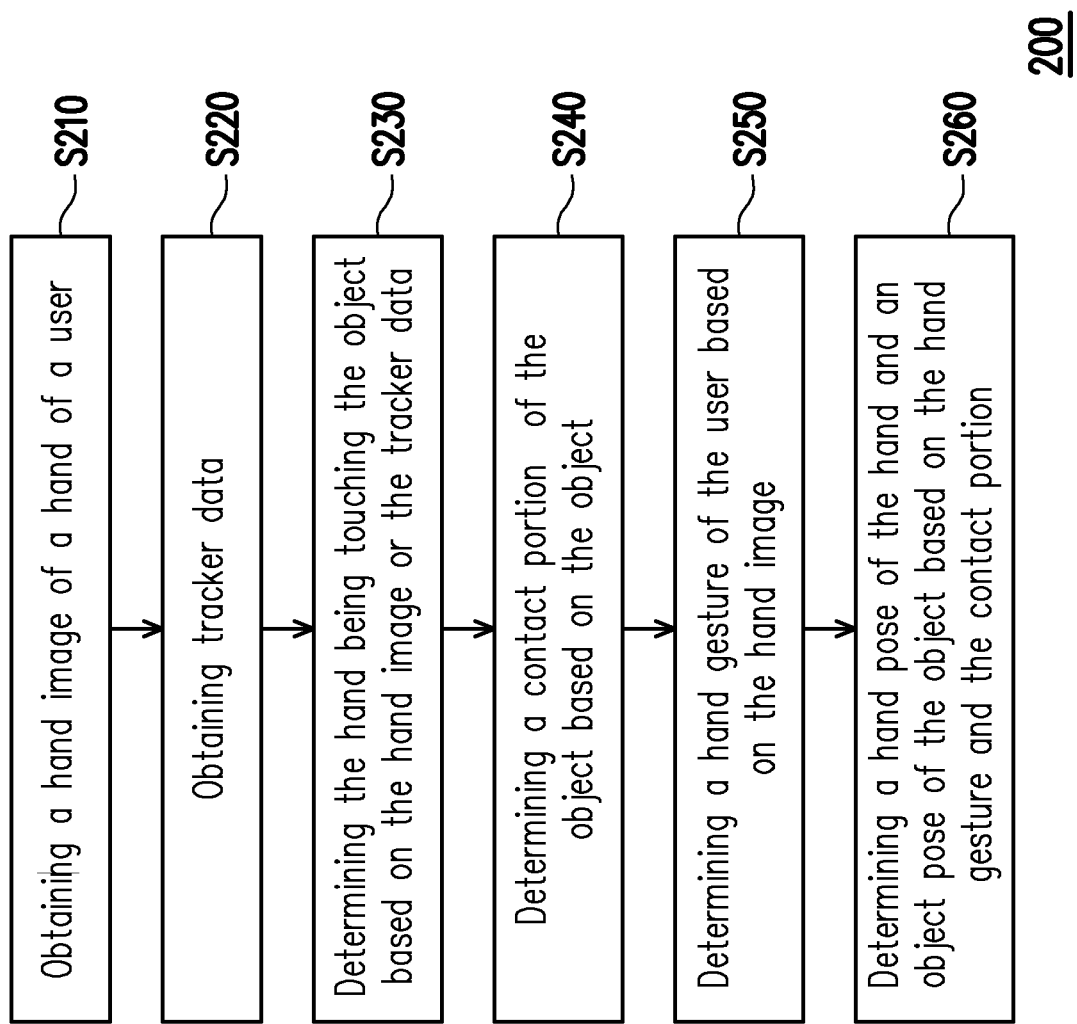
FIG. 2 is a schematic flowchart of a hand tracking method according to an embodiment of the disclosure.

FIG. 2 is a schematic flowchart of a hand tracking method according to an embodiment of the disclosure. With reference to FIG. 1 and FIG. 2, a hand tracking method 200 may be executed by the hand tracking system 100 in FIG. 1, and the details of each step in FIG. 2 will be described below with the components shown in FIG. 1.

First, in a step S210, the camera 110 may be configured to obtain a hand image of a hand of a user. Next, in a step S220, the tracker 120 may be adapted to be attached to an object and configured to obtain tracker data.

Afterwards, in a step S230, the processor 140 may be configured to determine the hand being touching (e.g., in contact with) the object based on the hand image or the tracker data. Then, in a step S240, the processor 140 may be configured to determine a contact portion of the object based on the object. In one embodiment, the contact portion may be adapted to be in contact with the hand of the user. For example, the contact portion may be a handle or a grip of the object, but this disclosure is not limited thereto. Further, in a step S250, the processor 140 may be configured to determine a hand gesture of the user based on the hand image. Moreover, in a step S260, the processor 140 may be configured to determine a hand pose (e.g., direction and orientation) of the hand and an object pose of the object based on the hand gesture and the contact portion. In addition, the processor 140 may be configured to display a virtual hand and a virtual object based on the hand pose and the object pose respectively. In this manner, the hand and the object may be tracked correctly. Therefore, a virtual hand and a virtual object in the virtual world may be displayed in a realistic manner, thereby bringing a fully immersive experience to the user.

In addition, the implementation details of the hand tracking method 200 may be referred to the following descriptions to obtain sufficient teachings, suggestions, and implementation embodiments.

FIG. 3A is a schematic diagram of an interaction scenario between a hand and an object according to an embodiment of the disclosure. FIG. 3B is a schematic diagram of an interaction scenario between a hand and an object according to an embodiment of the disclosure. With reference to FIG. 3A and FIG. 3B, an interaction scenario 300A and an interaction scenario 300B depict exemplary embodiments that how a hand H grasps objects in various ways.

Reference is first made to FIG. 3A. The interaction scenario 300A may include the hand H, an object O1, an object O2, and an object O3. In one embodiment, the object O1 may be a gun, the object O2 may be a racket, and the object O3 may be a bat. However, this disclosure is not limited thereto.

In one embodiment, a user may intend to hold one of the object O1, the object O2, and the object O3 on the hand H. However, since a shape and a function of the object O1, the object O2, or the object O3 may be different, a best way to grasp the object O1, the object O2, or the object O3 may not be the same. That is, an optimal grasping position for the object O1, the object O2, or the object O3 may depend on the intended use. In one embodiment, the optimal grasping position may be also called as a contact portion. In other words, the contact portion may be adapted to be in contact with the hand H of the user.

For example, referring to the object O1, the contact portion of the object O1 may be a grip close to a trigger of the gun, so that the user may easily pull the trigger to shot a target. Next, referring to the object O2, the contact portion of the object O2 may be a grip far from a frame of the racket, so that the user may easily hit a target with racket. Moreover, referring to the object O3, the contact portion of the object O3 may be a handle far from the barrel of the bat, so that the user may easily hit a target with bat.

Reference is now made to FIG. 3B. The interaction scenario 300B may include a holding scenario 301, a holding scenario 302, and a holding scenario 303. Referring to the holding scenario 301, the hand H is in contact with (e.g., holding) the grip of the gun. Referring to the holding scenario 302, the hand H is in contact with the grip of the racket. Referring to the holding scenario 303, the hand H is in contact with the handle of the bat.

It is noted that, the holding scenario 301, the holding scenario 302, or the holding scenario 303 depicts an ideal condition how the hand H of the user is in contact with the object O1, the object O2, or object O3. In one embodiment, to perform a hand tracking of a hand, all 21 (joint) nodes of the hand H need to be captured by the camera 110. However, due to some nodes of the hand H may be occluded by the object O1, the object O2, or object O3, the hand tracking of the hand H may not be performed properly. For example, a virtual object (corresponding to the object O1, the object O2, or object O3) may not seem to stick to a virtual hand (corresponding to the hand H). That is, the virtual hand or the virtual hand gesture of the virtual hand may look awkward. In other words, the non-realist phenomenon may have a negative impact on the user experience, thereby decreasing the immersive experience.

Figure 4A:
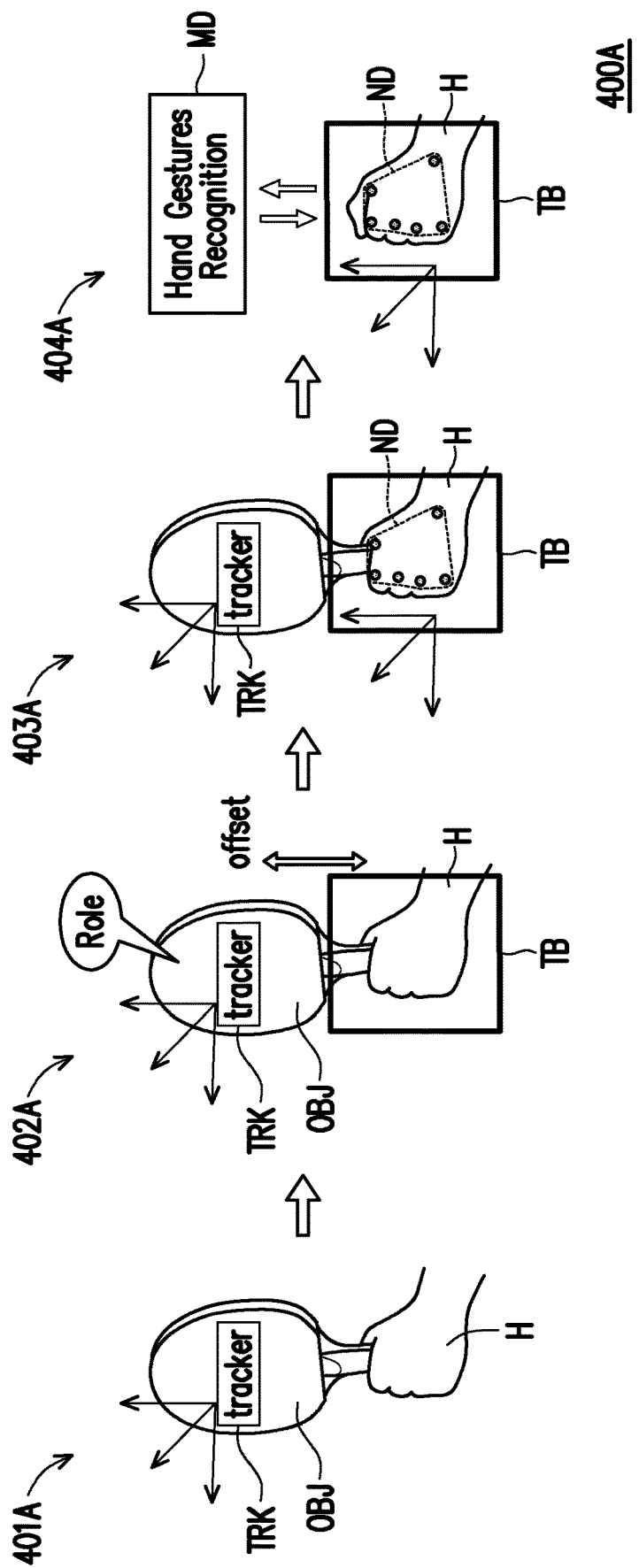
FIG. 4A is a schematic diagram of a hand tracking scenario for one hand according to an embodiment of the disclosure.
Figure 4B:
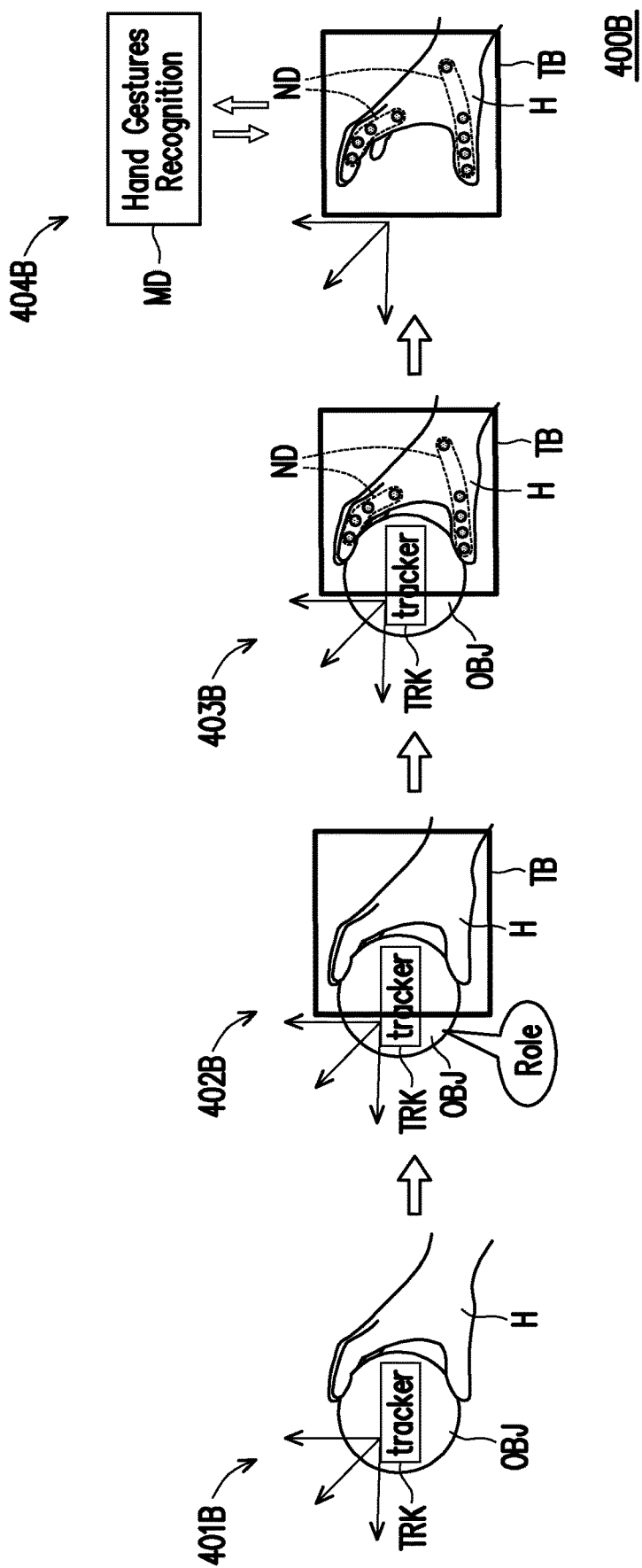
FIG. 4B is a schematic diagram of a hand tracking scenario for one hand according to an embodiment of the disclosure.

FIG. 4A is a schematic diagram of a hand tracking scenario for one hand according to an embodiment of the disclosure. FIG. 4B is a schematic diagram of a hand tracking scenario for one hand according to an embodiment of the disclosure. With reference to FIG. 4A and FIG. 4B, a hand tracking scenario 400A and a hand tracking scenario 400B depict exemplary embodiments of a tracking process of the hand H.

Reference is first made to FIG. 4A. The hand tracking scenario 400A may include the hand H, an object OBJ, and a tracker TRK. As shown in FIG. 4A, an object type of the object OBJ may be a ping pong paddle. In one embodiment, the tracker TRK may be adapted to be attached to the object OBJ or embedded in the object OBJ, and is not limited thereto. That is, the tracker TRK may be associated with the object OBJ to provide information of the object OBJ. For example, the tracker TRK may be configured to provide three linear acceleration values and/or three angular velocities related to three axes. However, this disclosure is not limited thereto. Moreover, for different objects OBJ, the tracker TRK may be installed at a suitable location. In other words, the (relative) position of the tracker TRK with respect to the object OBJ may be known. However, the disclosure is not limited thereto.

First, in a tracking process 401A, as shown in step S230 in FIG. 2, in response to a specific condition being satisfied or triggered, the processor 140 may be configured to determine that hand H being in contact with the object OBJ. In one embodiment, based on tracker data of the tracker TRK and/or the hand image, the processor 140 may be configured to determine whether the hand H being in contact with the object OBJ or not. In another embodiment, a distance sensor or a contact sensor may be included in the object OBJ. Based on sensor data of the distance sensor or the contact sensor, the processor 140 may be configured to determine whether the hand H being in contact with the object OBJ or not. However, this disclosure is not limited thereto.

Next, in a tracking process 402A, the processor 140 may be configured to determine an object type of the object OBJ. The object type may be also known as a role of the object OBJ. In one embodiment, the object type may include a sports equipment, a shooting equipment, or a weapon. However, this disclosure is not limited thereto. In one embodiment, object information of the object OBJ or a tracker number of the tracker TRK may be stored in the tracker TRK. Based on the object information or the tracker number, an object type of the object OBJ may be determined. That is, the object information may include the object type and the object type or the tracker number may indicate the object OBJ that the tracker TRK is associated with. In another embodiment, an object database may be stored in the memory 130 and may be configured to store a plurality of object types and object information for identifying the plurality of object types. For example, the object database may be a neural network model that is pre-trained with various objects types. That is, the object type of the object OBJ may be determined utilizing object information and an object recognition algorithm based on an image (e.g., the hand image) obtained by the camera 110. However, this disclosure is not limited thereto.

Further, as shown in step S240 in FIG. 2, in response to the object type being determined, the processor 140 may be configured to determine the contact portion of the object OBJ based on the object type. For example, the contact portion may be the optimal grasping position of the object OBJ. In other words, for different object types, the position of the contact portion of the object OBJ may be different. Next, after the contact portion is determined, since the object type is determined and the installation location of the tracker TRK may be known, a distance between the tracker TRK and the contact portion may be also determined (based on the object type), which may be also known as an offset distance.

On the other hand, instead of determining the contact portion based on the object type, the contact portion may be determined based on the hand image (e.g., the contact portion may be where the hand H of the user is in contact with the object OBJ in the hand image). Further, for different object types, the distances between (an installation location of) the tracker TRK and the contact portion may be pre-stored in the memory 130. That is, for each object type, the tracker TRK may be mounted on a specific location of the object OBJ. Therefore, instead of based on the object information, the processor 140 may be configured to determine the object type of the object OBJ based on the distance between the tracker TRK and the contact portion.

Moreover, based on the tracker data, a coordinate of the tracker TRK in the space may be determined. Thus, based on the coordinate of the tracker TRK and the offset distance, a coordinate or a position of the contact portion may be determined. The contact portion is configured to be in contact with the user's hand H. Therefore, based on the coordinate or the position of the contact portion, a tracking box TB may be determined. The tracking box TB may be an area that is used to perform a hand tracking of the hand H. That is, after the object type and the contact portion are determined, the tracking box TB for the hand tracking may be determined.

Afterwards, in a tracking process 403A, based on the tracking box TB, the hand tracking of the hand H may be preliminarily performed. It is worth noting that, as mentioned above, since some nodes of hand H may be obscured by the object OBJ at the same time, the hand tracking of hand H may not be performed appropriately. Therefore, based on the tracking box TB, a plurality of tracking nodes ND of all nodes of the hand H may be preliminarily determined. The plurality of tracking nodes ND may be key nodes or feature nodes of the hand H and may be utilized to preliminarily determine a hand pose of the hand H. That is, based on the plurality of tracking nodes ND, the hand tracking of the hand H may be preliminarily performed. Similarly, since the coordinate of the tracker TRK on the object OBJ is known, an object tracking of the object OBJ may be preliminarily performed to obtain a preliminary object pose of the object OBJ.

Then, in a tracking process 404A, as shown in step S250 in FIG. 2, based on the tracking result of the hand tracking, a preliminary hand gesture of the hand H may be determined. For example, for different object types, the user may use different gestures to hold the object OBJ. In other words, when the type of object is known, the gesture used by the user to hold the object OBJ may be predicted. Moreover, a hand gesture model MD may be further pre-trained to perform hand gestures recognition based on the hand image and/or the object type. However, this disclosure is not limited thereto. That is, the hand gesture of the hand H may be determined based on the hand image and/or the object type utilizing the hand gesture model MD. After the hand gesture is determined, as shown in the step S260 in FIG. 2, an optimized hand pose of the hand H and an optimized object pose of the object OBJ may be determined to make sure that the hand His placing on the contact portion. That is, the optimized hand pose of the hand H and the optimized object pose of the object OBJ may be determined to make sure that, in the virtual world, the virtual object may seem to stick to the virtual hand. In other words, a surface of the virtual hand may fit to a surface of the virtual object (e.g., the contact portion). Therefore, the virtual hand and the virtual object may be displayed in a realistic manner, thereby bringing a fully immersive experience to the user.

It is worth mentioned that, in the tracking scenario 400A, it is assumed that the hand His properly holding the object OBJ. That is, the hand H may be placed on the contact portion of the object OBJ. However, under certain circumstances, the hand H may be incorrectly holding the object OBJ. That is, the hand H may be placed somewhere other than then contact portion. The area where the hand H places on the object OBJ may be called a touch area. In other words, the touch area is different from the contact portion. Alternatively, the hand H may be placed on the contact portion, but only part of the hand H may be only in contact with contact portion or the hand H may be placed in a wrong direction on the contact portion. In other words, the touch area may be partially different from the contact portion. Therefore, the processor 140 may be configured to determine that whether the hand H is placing on the contact portion correctly based on the (optimized) hand pose. In addition, in response to the hand H being not placing on the contact portion correctly, the processor 140 may be configured to generate an instruction message to instruct the user to place the hand H on the contact portion correctly. For example, the instruction message may be a text message or an image displayed in the virtual world, so that the user may follow the instruction message to place the hand H on the contact portion correctly. However, this disclosure is not limited thereto.

Reference is now made to FIG. 4B. Similar to the hand tracking scenario 400A, the hand tracking scenario 400B may include the hand H, an object OBJ, and a tracker TRK. As shown in FIG. 4B, an object type of the object OBJ may be a baseball. Further, the hand tracking scenario 400B may include a tracking process 401B, a tracking process 402B, a tracking process 403B, and a tracking process 404B.

It is noted that, since the difference between the hand tracking scenario 400A and the hand tracking scenario 400B is the object type of the object OBJ, the implementation details of the hand tracking scenario 400B may be referred to the hand tracking scenario 400A to obtain sufficient teachings, suggestions, and implementation embodiments, while the details are not redundantly described seriatim herein. That is, the tracking process 401B, the tracking process 402B, the tracking process 403B, and the tracking process 404B may be referred to the tracking process 401A, the tracking process 402A, the tracking process 403A, and the tracking process 404A. However, this disclosure is not limited.

Figure 5A:
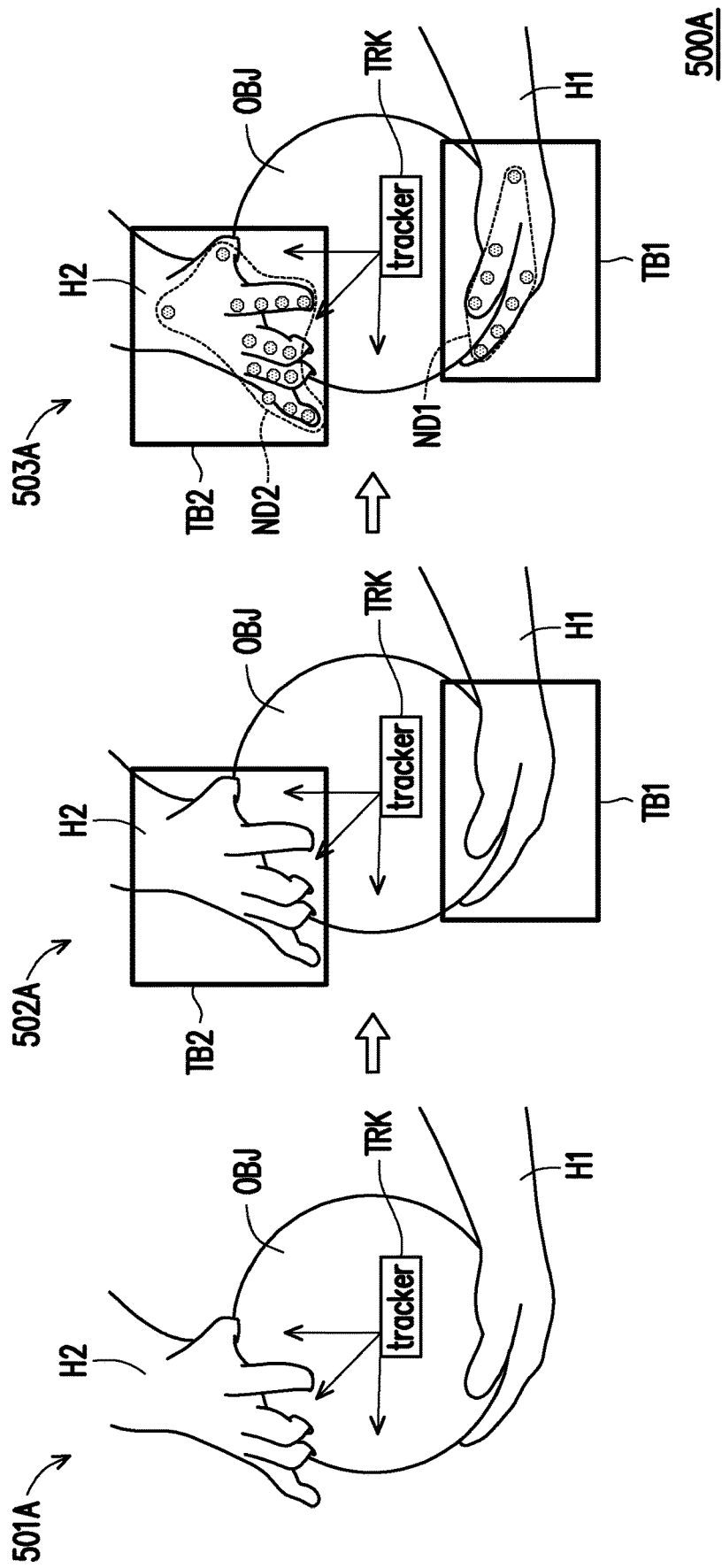
FIG. 5A is a schematic diagram of a hand tracking scenario for both hands according to an embodiment of the disclosure.
Figure 5B:
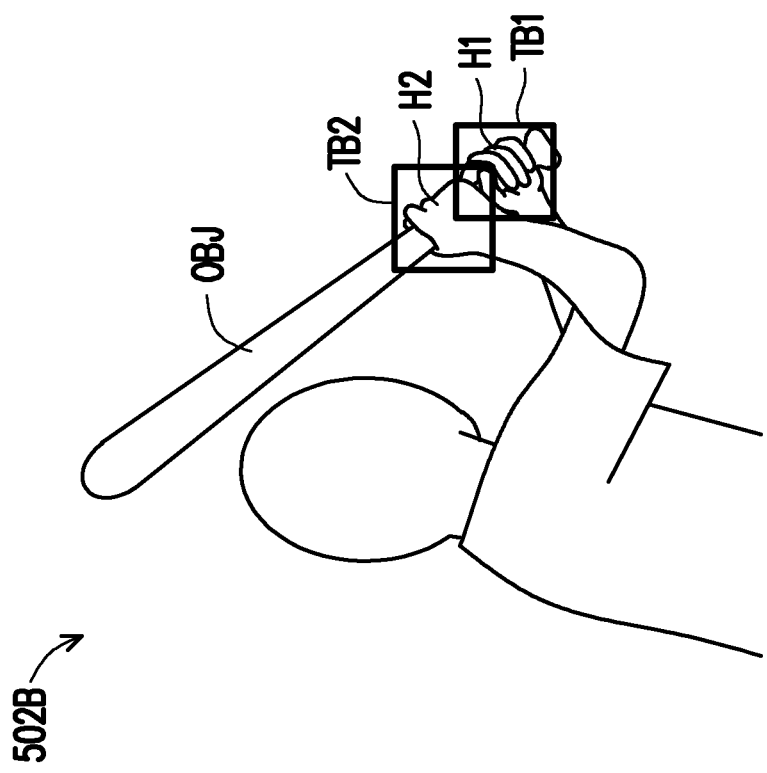
FIG. 5B is a schematic diagram of a hand tracking scenario for both hands according to an embodiment of the disclosure.
Figure 5B:
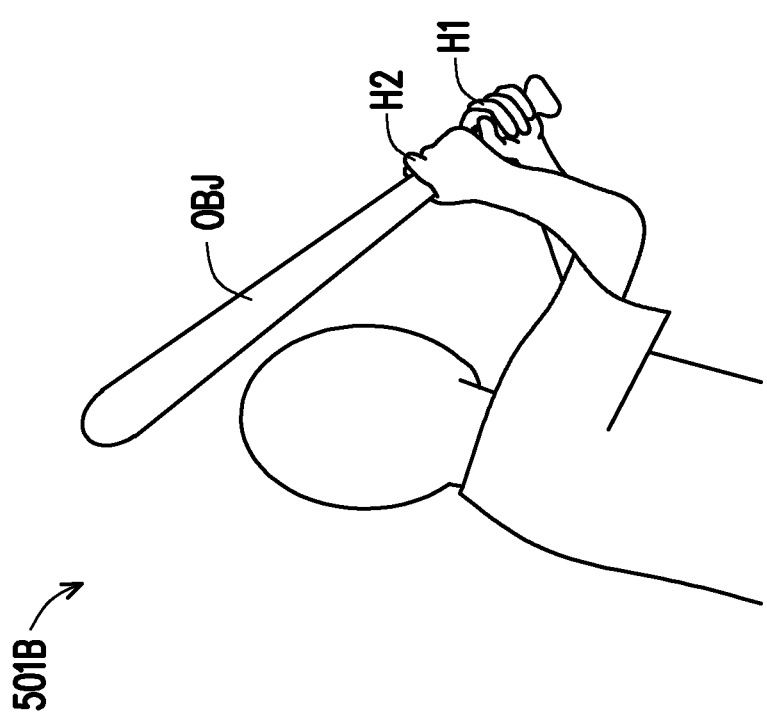

FIG. 5A is a schematic diagram of a hand tracking scenario for both hands according to an embodiment of the disclosure. FIG. 5B is a schematic diagram of a hand tracking scenario for both hands according to an embodiment of the disclosure. With reference to FIG. 5A and FIG. 5B, a hand tracking scenario 500A and a hand tracking scenario 500B depict exemplary embodiments of a tracking process of both hands.

Reference is first made to FIG. 5A. The hand tracking scenario 500A may include a hand H1 (may be also known as the hand H), a hand H2 (may be also known as an additional hand), an object OBJ, and a tracker TRK. As shown in FIG. 5A, an object type of the object OBJ may be a bowling ball. Further, since the bowling ball is held by two hands, two portion of the object OBJ may be in contact with the hand H1 and the hand H2 respectively. For example, an additional contact portion of the object OBJ may be a gripping area including the thumb hole and the two finger holes and the gripping area may be adapted to be in contact with the hand H2. Further, a contact portion of the object OBJ may be a holding area for holding a weight of the object OBJ and the holding area may be adapted to be in contact with the hand H1. However, this disclosure is not limited thereto.

First, in a tracking process 501A, as shown in step S230 in FIG. 2, in response to a specific condition being satisfied or triggered, the processor 140 may be configured to determine that hand H1 and the hand H2 being touching (e.g., in contact with) the object OBJ. In one embodiment, based on tracker data of the tracker TRK and/or the hand image of the hand H1 and an additional hand image of the hand H2 obtained from the camera 110, the processor 140 may be configured to determine whether the hand H1 and the hand H2 being in contact with the object OBJ or not. In another embodiment, a distance sensor or a contact sensor may be included in the object OBJ. Based on sensor data of the distance sensor or the contact sensor, the processor 140 may be configured to determine whether the hand H1 and the hand H2 being in contact with the object OBJ or not. However, this disclosure is not limited thereto.

Next, in a tracking process 502A, the processor 140 may be configured to determine an object type of the object OBJ. Besides, as shown in step S240 in FIG. 2, the processor 140 may be configured to determine the contact portion and the additional contact portion of the object OBJ based on the object type and/or the hand image and the additional hand image. The above process may be referred to the description of the tracking process 402A. That is, in one embodiment, the object type of the object OBJ, the contact portion and the additional contact portion may be determined based on the object information of the object OBJ or the tracker number of the tracker TRK stored in the tracker TRK. In other words, for different object types, the locations of the contact portion and the additional contact portion of the object OBJ may be different. In another embodiment, the object type of the object OBJ, the contact portion and the additional contact portion may be determined based on the object database stored in the memory 130 and/or the hand image and additional hand image. However, this disclosure is not limited thereto.

For example, the contact portion and additional contact portion may be the optimal grasping positions of the object OBJ. After the contact portion and the additional contact portion are determined, since the object type is determined, an offset distance between the tracker TRK and the contact portion and an additional offset distance between the tracker TRK and the additional contact portion may be also determined. Moreover, based on the tracker data, a coordinate of the tracker TRK in the space may be determined. Thus, based on the coordinate of the tracker TRK, the offset distance, and the additional offset distance, a coordinate or a position of the hand H1 and a coordinate or a position of the hand H2 may be determined to determine a tracking box TB1 and a tracking box TB2. That is, after the object type and the contact portion and/or the additional contact portion are determined, the tracking box TB1 and/or the tracking box TB2 for the hand tracking may be determined.

Afterwards, in a tracking process 503A, based on the tracking box TB1 and the tracking box TB2, a plurality of tracking nodes ND1 and a plurality of tracking nodes ND2 may be determined to preliminarily perform the hand tracking of the hand H1 and the hand tracking of the hand H2. Further, the tracking result of the hand tracking of the hand H1 and/or the hand H2 may be utilized to determine a preliminary hand pose of the hand H1, a preliminary hand pose of the hand H2 (also known as an additional hand pose), or a preliminary object pose of the object OBJ.

Then, although it is not depicted in the FIG. 5A, similar as the tracking process 404A, as shown in step S250 in FIG. 2, based on the tracking result of the hand tracking of the hand H1 and the hand H2, a hand gesture of the hand H1 and an additional hand gesture of the hand H2 may be determined. For example, for different object types, the user may use different gestures and additional gestures to grasp the object OBJ. That is, when the object type is known, the gesture and the additional gesture used by the user to grasp the object OBJ may be predictable. After the hand gesture and the additional hand gesture are determined, as shown in step S260 in FIG. 2, an optimized hand pose of the hand H1, an optimized additional hand pose of the hand H2, and an optimized object pose of the object OBJ may be determined to make sure that the hand H1 and the hand H2 are respectively placing on the contact portion and the additional contact portion. That is, the optimized hand pose of the hand H1, the optimized hand pose of the hand H2, and the optimized object pose of the object OBJ may be determined to make sure that, in the virtual world, the virtual object may seem to stick to the virtual hand and a virtual additional hand. In other words, a surface of the virtual hand and a surface of the virtual additional hand may fit to a surface of the virtual object. Therefore, the virtual hand, the virtual additional hand and the virtual object may be displayed in a realistic manner, thereby bringing a fully immersive experience to the user.

It is worth mentioned that, in the tracking scenario 500A, it is assumed that the object type of the object OBJ may be determined based on the object information, the tracker number, or the object database. However, under certain circumstances, the tracker TRK is just attached to the object OBJ and the object information is not yet stored in the tracker TRK. In one embodiment, the processor 140 may be configured to determine the object type of the object OBJ based the contact portion and the additional contact portion. To be more specific, for different object types, users may use different ways to hold the object OBJ. Therefore, based on how the user is holding the object OBJ, a shape, a size, a direction . . . etc. of the object OBJ may be determined. For example, the two places where the hand H1 and the hand H2 may form a boundary of the object OBJ. Based on the boundary of the object OBJ and/or the gesture of the hand H1 and the additional gesture of the hand H2, the object type of the object OBJ may be determined. This information for identify the object type may be pre-stored in an object identification database, but is not limited thereto. In other words, although originally the object type is unknown, the object type may be determined based on the contact portion and the additional contact portion. After the object type is known, the hand tracking of the hand H1 and the hand H2 may be performed more accurately.

Reference is now made to FIG. 5B. Similar to the hand tracking scenario 500A, the hand tracking scenario 500B may include the hand H1, the hand H2, an object OBJ, and a tracker TRK. As shown in FIG. 5B, an object type of the object OBJ may be a baseball bat. Further, the hand tracking scenario 500B may include a tracking process 501B, and a tracking process 502B. For the sake of clarity for better understanding, FIG. 5B has been simplified. For example, the tracker TRK and the node ND are not depicted in the FIG. 5B.

It is noted that, since the difference between the hand tracking scenario 500A and the hand tracking scenario 500B is the object type of the object OBJ, the implementation details of the hand tracking scenario 500B may be referred to the hand tracking scenario 500A to obtain sufficient teachings, suggestions, and implementation embodiments, while the details are not redundantly described seriatim herein. That is, the tracking process 501B and the tracking process 502B may be referred to the tracking process 501A and the tracking process 502A. Further, although it is not depicted in the FIG. 5B, similar processes as the tracking process 503A and the tracking process 404A may be included in the hand tracking scenario 500B. However, this disclosure is not limited.

Figure 5C:
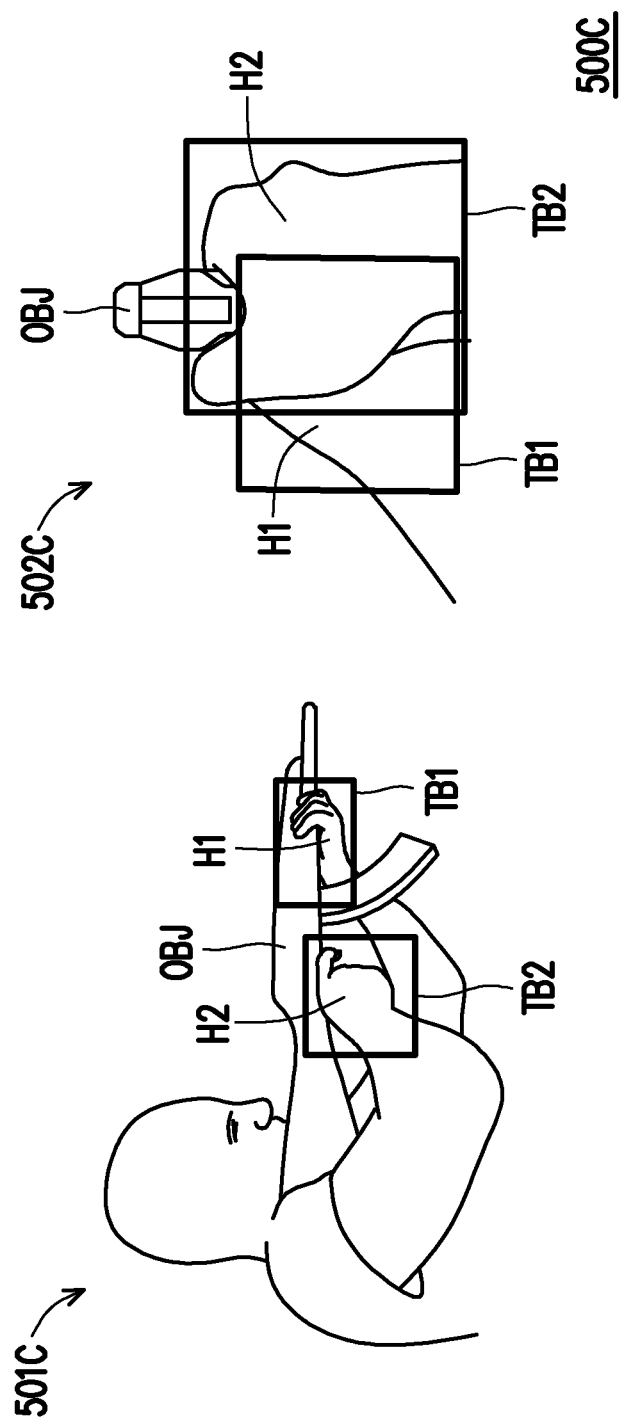
FIG. 5C is a schematic diagram of a hand tracking scenario for both hands according to an embodiment of the disclosure.
Figure 5D:
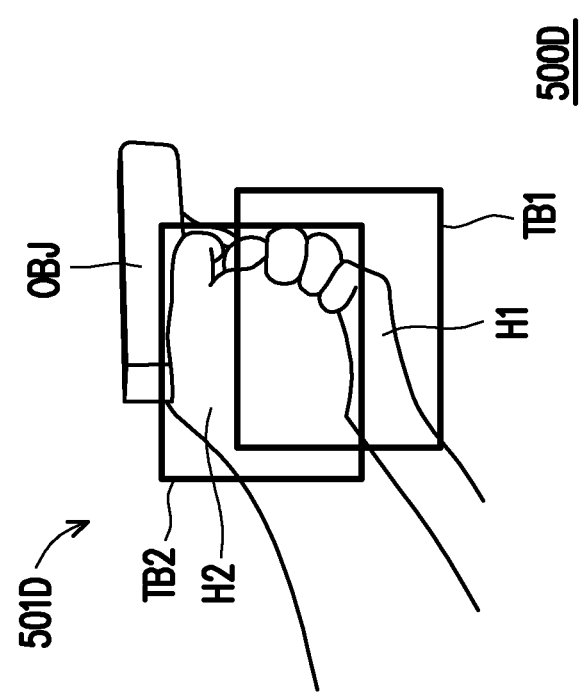
FIG. 5D is a schematic diagram of a hand tracking scenario for both hands according to an embodiment of the disclosure.

FIG. 5C is a schematic diagram of a hand tracking scenario for both hands according to an embodiment of the disclosure. FIG. 5D is a schematic diagram of a hand tracking scenario for both hands according to an embodiment of the disclosure. With reference to FIG. 5C and FIG. 5D, a hand tracking scenario 500C and a hand tracking scenario 500D depict exemplary embodiments of a tracking process of both hands. It is noted that, part of the hand H1 or part of the hand H2 may be occluded. Further, for the sake of clarity for better understanding, FIG. 5C and FIG. 5D have been simplified. For example, the tracker TRK and the node ND are not depicted in the FIG. 5C and FIG. 5D.

Reference is first made to FIG. 5C. The hand tracking scenario 500C may include a hand H1, a hand H2, and an object OBJ. As shown in FIG. 5C, an object type of the object OBJ may be a rifle. Further, the hand tracking scenario 500C may include a side view 501C and a rear view 502C. It is noted that, since the difference between the hand tracking scenario 500A and the hand tracking scenario 500C is the object type of the object OBJ, the implementation details of the hand tracking scenario 500C may be referred to the hand tracking scenario 500A to obtain sufficient teachings, suggestions, and implementation embodiments, while the details are not redundantly described seriatim herein.

As shown in the side view 501C, the object OBJ may be held by the hand H1 and hand H2. Further, the tracking box TB1 and the tracking box TB2 may be already determined. However, as shown in the rear view 502C, part of the hand H1 is occluded by the hand H2. That is, since the hand H1 may not be completely captured by the camera 110, the tracking box TB1 may not be determined properly. Further, even if the tracking box TB1 is determined properly, some of the tracking nodes ND1 of the hand H1 may be occluded by the hand H2, thereby may causing a negative impact on the hand tracking of the hand H1.

It is worth mentioned that, by determining the object type of the object OBJ and the hand gesture of the hand H1, where the rest of the tracking node ND1 place on the object OBJ may be determined. That is, even if part of the hand H1 is occluded by the hand H2, the hand tracking of the hand H1 may be still performed correctly, thereby increasing the user experience. Vice versa. On the other hand, while the object type of the object OBJ is unknown, the object type of the object OBJ may be determined based on the tracking box TB1 and the tracking box TB2. To be more specific, the object type of the object OBJ may be determined based on the contact portion of the hand H1 and the additional contact portion of the hand H2. For example, as shown in FIG. 5C, from the side view 501C, the hand H1 is separated from the hand H2. Moreover, from the rear view 502C, the hand H1 is closed to the hand H2. Therefore, the object OBJ may be determined as a rifle. However, this disclosure is not limited thereto.

Reference is now made to FIG. 5D. The hand tracking scenario 500D may include a hand H1, a hand H2, and an object OBJ. As shown in FIG. 5D, an object type of the object OBJ may be a pistol. Further, the hand tracking scenario 500D may include a side view 501D. It is noted that, since the difference between the hand tracking scenario 500A and the hand tracking scenario 500D is the object type of the object OBJ, the implementation details of the hand tracking scenario 500D may be referred to the hand tracking scenario 500A to obtain sufficient teachings, suggestions, and implementation embodiments, while the details are not redundantly described seriatim herein.

As shown in the side view 501D, the object OBJ may be held by the hand H1 and hand H2. Similar to the rear view 502C, part of the hand H1 may occluded by the hand H2. Thus, by determining the object type of the object OBJ and the hand gesture of the hand H1, the hand tracking of the hand H1 may be still performed correctly, thereby increasing the user experience. On the other hand, while the object type of the object OBJ is unknown, the object type of the object OBJ may be determined based on the tracking box TB1 and the tracking box TB2, or more specifically, based on the contact portion of the hand H1 and the additional contact portion of the hand H2. For example, as shown in FIG. 5D, from the side view 501D, the hand H1 is closed to the hand H2. Therefore, the object OBJ may be determined as a pistol. However, this disclosure is not limited thereto.

In summary, according to the hand tracking system 100 and the hand tracking method 200, the hand H (hand H1 and/or hand H2) and the object OBJ may be tracked correctly. Therefore, a virtual hand and a virtual object in the virtual world may be displayed in a realistic manner, thereby bringing a fully immersive experience to the user.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A hand tracking system, comprising:
   a camera, configured to obtain a hand image of a hand of a user;
   a tracker, adapted to be attached to a specific location of an object and configured to obtain tracker data;
   a memory, configured to store a program code; and
   a processor, configured to access the program code to execute:
   determining the hand touching the object based on the hand image or the tracker data;
   determining a contact portion of the object based on the object, wherein the contact portion is adapted to be in contact with the hand of the user;
   determining an object type of the object based on a distance between the contact portion and the tracker by comparing the distance with pre-stored distances of a plurality of pre-stored object types;
   determining a hand gesture of the user based on the hand image; and
   determining a hand pose of the hand and an object pose of the object based on the hand gesture and the contact portion.

2. The hand tracking system according to claim 1, wherein the processor is further configured to access the program code to execute:
   determining the object type of the object based on object information of an object database stored in the tracker or stored in the memory.

3. The hand tracking system according to claim 1, wherein the processor is further configured to access the program code to execute:
   determining the contact portion of the object based on the object type of the object.

4. The hand tracking system according to claim 1, wherein the processor is further configured to access the program code to execute:
   determining an offset distance between the tracker and the contact portion based on the object type of the object.

5. The hand tracking system according to claim 4, wherein the processor is further configured to access the program code to execute:
   determining a tracking box of the hand based on the offset distance;
   performing a hand tracking of the hand based on the tracking box; and
   determining the hand pose and the object pose based on a tracking result of the hand tracking.

6. The hand tracking system according to claim 5, wherein the processor is further configured to access the program code to execute:
   determining a plurality of tracking nodes based on the tracking box; and performing the hand tracking based on the plurality of tracking nodes.

7. The hand tracking system according to claim 5, wherein the processor is further configured to access the program code to execute:
   determining the hand gesture of the hand based on the tracking result; and
   determining the hand pose and the object pose based on the hand gesture.

8. The hand tracking system according to claim 1, wherein the processor is further configured to access the program code to execute:
   determining whether the hand is placing on the contact portion correctly based on the hand pose.

9. The hand tracking system according to claim 1, wherein the processor is further configured to access the program code to execute:
   in response to the hand being not placing on the contact portion correctly, generating a instruction message to instruct the user to place the hand on the contact portion correctly.

10. The hand tracking system according to claim 1, wherein the processor is further configured to access the program code to execute:
   determining an additional hand touching the object based on an additional hand image or the tracker data; and
   determining an additional contact portion of the object based on the additional hand image, wherein the additional contact portion is adapted to be in contact with the additional hand.

11. The hand tracking system according to claim 10, wherein the processor is further configured to access the program code to execute:
   determining an additional hand gesture of the additional hand based on the additional hand image; and
   determining an additional hand pose of the additional hand based on the additional hand gesture and the additional contact portion.

12. The hand tracking system according to claim 10, wherein the processor is further configured to access the program code to execute:
   determining the object type of the object based on a boundary formed by the contact portion and the additional contact portion by comparing the boundary with pre-stored boundaries of the plurality of pre-stored object types.

13. The hand tracking system according to claim 1, wherein the processor is further configured to access the program code to execute:
   displaying a virtual hand and a virtual object based on the hand pose and the object pose respectively.

14. A hand tracking method, comprising:
   obtaining, by a camera, a hand image of a hand of a user;
   obtaining, by a tracker, tracker data, wherein the tracker is adapted to be attached to a specific location of an object;
   determining, by a processor, the hand touching the object based on the hand image or the tracker data;
   determining a contact portion of the object based on the object, wherein the contact portion is adapted to be in contact with the hand of the user;
      determining an object type of the object based on a distance between the contact portion and the tracker by comparing the distance with pre-stored distances of a plurality of pre-stored object types;
   determining a hand gesture of the user based on the hand image; and
   determining a hand pose of the hand and an object pose of the object based on the hand gesture and the contact portion.

15. The hand tracking method according to claim 14, further comprising:
   determining the object type of the object based on object information of an object database stored in the tracker or stored in a memory.

16. The hand tracking method according to claim 14, further comprising:
   determining the contact portion of the object based on the object type of the object.

17. The hand tracking method according to claim 14, further comprising:
   determining an offset distance between the tracker and the contact portion based on the object type of the object.

18. The hand tracking method according to claim 17, further comprising:
   determining a tracking box of the hand based on the offset distance;
   performing a hand tracking of the hand based on the tracking box; and
   determining the hand pose and the object pose based on a tracking result of the hand tracking.

19. The hand tracking method according to claim 18, further comprising:
   determining a plurality of tracking nodes based on the tracking box; and
   performing the hand tracking based on the plurality of tracking nodes.

* * * * *